United States Patent [19]
Sato et al.

[11] Patent Number: 5,185,712
[45] Date of Patent: Feb. 9, 1993

[54] VIEWFINDER AND IMAGE DISPLAY/PICKUP APPARATUS USING LIQUID CRYSTAL

[75] Inventors: Makoto Sato, Fussa; Tatsuo Shimazaki, Tokyo; Hideki Nakamura, Hamura, all of Japan

[73] Assignee: Casio Computer Co., Ltd., Tokyo, Japan

[21] Appl. No.: 825,826

[22] Filed: Jan. 24, 1992

Related U.S. Application Data

[63] Continuation of Ser. No. 537,373, Jun. 13, 1990, abandoned.

[30] Foreign Application Priority Data

Jun. 30, 1989 [JP] Japan .................. 1-169434
Jun. 30, 1989 [JP] Japan .................. 1-169435
Jun. 30, 1989 [JP] Japan .................. 1-169436

[51] Int. Cl.$^5$ .......................... H04N 5/30; H04N 9/31
[52] U.S. Cl. ...................................... 358/224; 358/60; 358/61; 358/41; 359/618; 359/634; 353/34
[58] Field of Search ............... 358/224, 209, 60-63, 358/230, 56, 59; 353/31, 34; 340/789 AL, 719; 354/219

[56] References Cited

U.S. PATENT DOCUMENTS

| | | | |
|---|---|---|---|
| 1,319,292 | 10/1951 | Kunz | 350/173 |
| 4,368,963 | 1/1983 | Stolov | 353/31 |
| 4,437,126 | 3/1984 | Gottschalk | 358/224 |
| 4,864,390 | 9/1989 | McKechnie et al. | 358/60 |

FOREIGN PATENT DOCUMENTS

| | | | |
|---|---|---|---|
| 0196192 | 8/1988 | Japan . | |
| 0216025 | 9/1988 | Japan | 358/59 |

Primary Examiner—James J. Groody
Assistant Examiner—Safet Metjahic
Attorney, Agent, or Firm—Frishauf, Holtz, Goodman & Woodward

[57] ABSTRACT

A liquid crystal viewfinder includes a plurality of liquid crystal display sections for respectively displaying images of a plurality of colors so as to obtain a full-color image, and an eyepiece. The liquid crystal display sections are arranged on the same plane along an outer side surface of an image pick up apparatus. The eyepiece is arranged outside the liquid crystal display sections in such a manner that the optical axis of the eyepiece is set to be substantially parallel to the direction in which the liquid crystal display sections are arranged. An image light reflecting mirror is arranged on the incidence side of the eyepiece so as to reflect an image light beam from one of the liquid crystal display sections to the eyepiece. Image light synthesizing mirrors are arranged between the image light reflecting mirror and the eyepiece so as to reflect image light beams from the other liquid crystal display sections to the eyepiece and to transmit the image light beam reflected by the image light reflecting mirror.

12 Claims, 8 Drawing Sheets

VIEWFINDER AND IMAGE DISPLAY/PICKUP APPARATUS USING LIQUID CRYSTAL

This application is a continuation of application Ser. No. 07/537,373, filed Jun. 13, 1990 now abandoned.

BACKGROUND OF THE INVENTION

1. Field of the Invention

The present invention relates to an electronic viewfinder, a display apparatus such as a projector, and a video camera using liquid crystals.

2. Description of the Related Art

A liquid crystal viewfinder is used as a viewfinder arranged in an image pick up apparatus such as a video camera. The liquid crystal viewfinder is designed such that an image formed by the image pick up apparatus is displayed on a liquid crystal display section, and the image displayed on the liquid crystal display section is seen through an eyepiece.

FIG. 1 shows a conventional liquid crystal viewfinder. Referring to FIG. 1, reference symbol A denotes an image pick up apparatus such as a video camera. The liquid crystal viewfinder is arranged on an outer side surface (e.g., the upper surface) of the image pick up apparatus A. An arrangement of the liquid crystal viewfinder will be described below. Referring to FIG. 1, reference numeral 1 denotes a finder case. A liquid crystal display panel 2 for displaying a full-color image is arranged in the case 1 on its front end side so as to be perpendicular to the outer side surface of the image pick up apparatus A. A panel-like backlight 3 using a fluorescent lamp is arranged behind the liquid crystal display panel 2. Reference numeral 4 denotes a mirror barrel which is arranged in the case 1 to perpendicularly oppose the liquid crystal display panel 2. The eyepiece-side end portion of the mirror barrel 4 extends outward from the rear end face of the case 1. An eyecup 5 is arranged on the extended end of the mirror barrel 4. An objective lens 6 is arranged on the inner end side of the mirror barrel 4. An eyepiece 7 is arranged on the outer end side, i.e., the eyepiece side of the mirror barrel 4.

This liquid crystal viewfinder is designed such that light radiated from the backlight 3 is incident on the liquid crystal panel 2, and a picked-up image signal from the image pick up apparatus A is sent to a display driver of the liquid crystal display panel 2 so as to cause the liquid crystal display panel 2 to display the picked-up image from the image pick up apparatus A. The image displayed on the liquid crystal display panel 2 is observed through the objective lens 6 and the eyepiece 7.

In the conventional liquid crystal viewfinder shown in FIG. 1, however, the resolution is low because a full-color image formed by the image pick up apparatus A is displayed on the single liquid crystal display panel 2. In addition, a large panel must be used as the liquid crystal display panel 2. As is known, the liquid crystal display panel 2 (to be referred to as a full-color liquid crystal display panel hereinafter) for displaying a full-color image is designed to form a full-color image by alternately arranging and displaying pixels of three colors, i.e., red, green, and blue. That is, one full-color pixel is expressed by three pixels of red, green, and blue. In order to obtain the same resolution as that of a monochromatic display panel for displaying a monochromatic image, the full-color liquid crystal display panel 2 requires the number of pixels three times that of the monochromatic image display panel. In other words, the full-color liquid crystal display panel 2 requires a screen three times as large as that of the monochromatic image display panel. Furthermore, in the conventional liquid crystal viewfinder, the full-color liquid crystal display panel 2 is arranged to be perpendicular to the outer side surface of the image pick up apparatus A. For this reason, if the liquid crystal display panel 2 is increased in size as described above, the height of the overall viewfinder is considerably increased. As a result, the viewfinder greatly protrudes outward from the image pick up apparatus A.

SUMMARY OF THE INVENTION

The present invention has been made in consideration of such a situation, and has as its object to provide a liquid crystal viewfinder which allows easy arrangement of a liquid crystal panel, can increase the resolution, and can decrease the protrusion height from an image pick up apparatus.

In order to obtain the above object, according to one aspect of the present invention, there is provided a liquid crystal viewfinder comprising:

a plurality of liquid crystal display elements positioned on the same plane;

a light source for illuminating said liquid crystal display elements;

a light synthesizing member for synthesizing images from said liquid crystal display elements; and an eyepiece for displaying an image obtained by said light synthesizing member.

With the above-described arrangement, the resolution can be increased as compared with a conventional liquid crystal viewfinder using a full-color liquid crystal display panel alternately arranging and displaying pixels of three colors, i.e., red, green, and blue. In addition, the positioning precision of the plurality of liquid crystal display panels can be easily increased, and the protrusion height of the overall viewfinder from the image pick up apparatus can be decreased.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The first embodiment of the present invention will be described below with reference to FIGS. 2 to 4.

Figure 4:
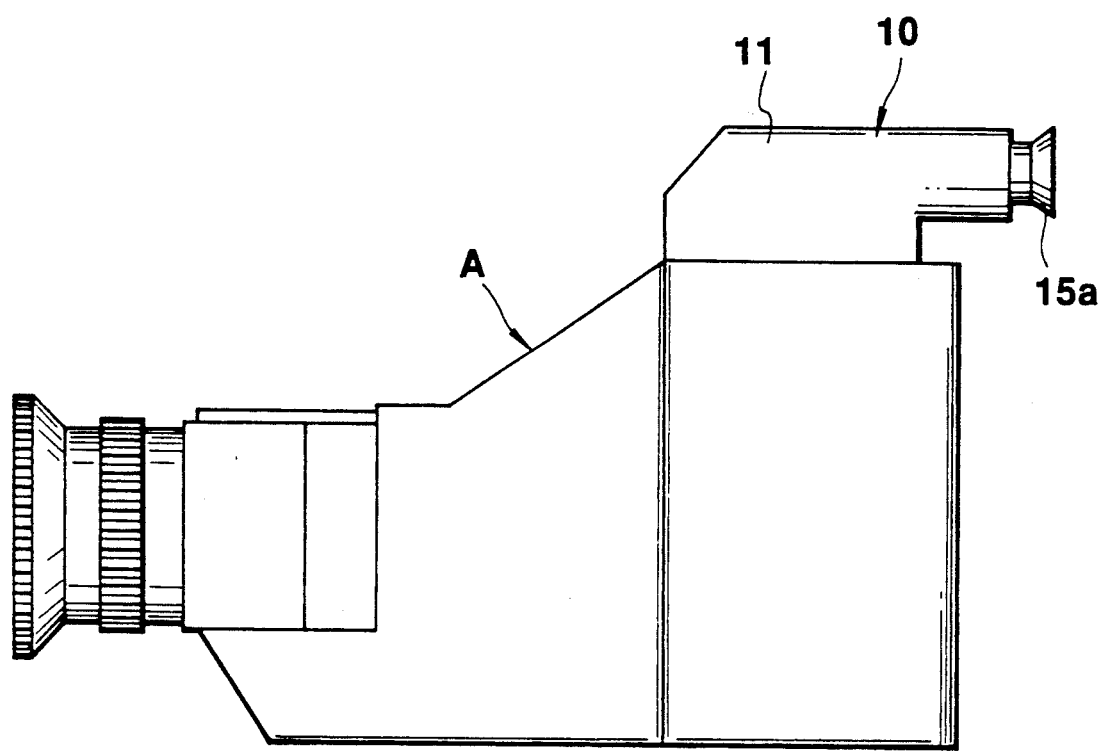
FIG. 4 is a view showing a video camera on which the viewfinder of the present invention is mounted.

FIG. 4 shows the outer appearance of an image pick up apparatus including a liquid crystal viewfinder of this embodiment. Referring to FIG. 4, reference symbol A denotes an image pick up apparatus such as a video camera, and reference numeral 10 denotes a liquid crystal viewfinder arranged on an outer side surface of the image pick up apparatus A (on the upper surface in FIG. 4).

An arrangement of the liquid crystal viewfinder 10 will be described blow. FIG. 2 is a sectional view of the liquid crystal viewfinder 10. Referring to FIG. 2, reference numeral 11 denotes a finder case; and 13R, 13G, and 13B, liquid crystal display sections, arranged in a row in the case 11 on the surface side which is mounted on the image pick up apparatus A, on the same plane along the outer side surface of the image pick up apparatus A, for respectively displaying red, green, and blue images. The three liquid crystal display sections 13R, 13G, and 13B are arranged in a row on the same plane and are designed to display red, green, and blue images, respectively. These liquid crystal display sections 13R, 13G, and 13B are formed on one liquid crystal display panel 12.

Figure 3:
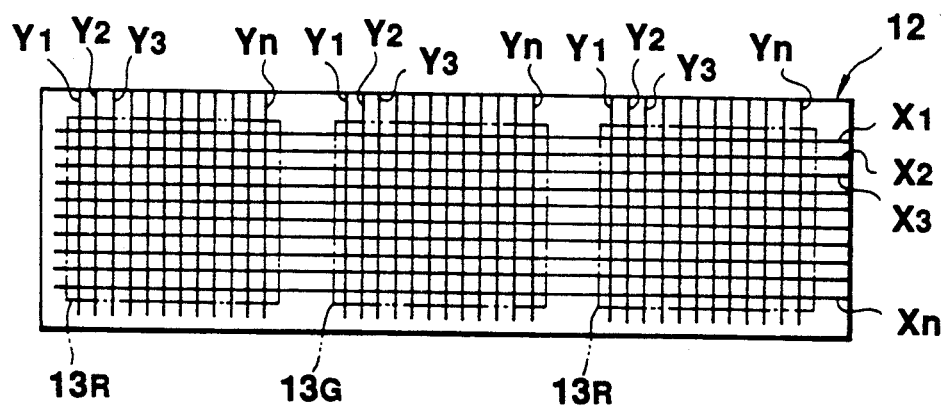
FIG. 3 is a view showing liquid crystal display sections of the viewfinder of the first embodiment.

FIG. 3 shows the liquid crystal display panel 12 on which the above-mentioned three liquid crystal display sections 13R, 13G, and 13B are formed. The green image display section 13G is formed in the middle of the liquid crystal display panel 12, and the red and blue image display sections 13R and 13B are respectively formed on its two side portions. A large number of stripe-like transparent scanning electrodes (common electrodes) X1, X2, ... Xn are formed on the liquid crystal display sections 13R, 13G, and 13B so as to extend in the longitudinal direction of the liquid crystal display panel 12, together with a large number of stripe-like transparent signal electrodes (segment electrodes) Y1, Y2, ... Yn perpendicularly crossing the scanning electrodes X1, X2, ... Xn. Note that the scanning electrodes X1, X2, ... Xn are formed on one of a pair of transparent substrates opposing each other through a liquid crystal layer, and the signal electrodes Y1, Y2, ... Yn are formed on the other transparent substrate. The scanning electrodes X1, X2, ... Xn continuously extend throughout the respective liquid crystal display sections 13R, 13G, and 13B, whereas the signal electrodes Y1, Y2, ... Yn are independently formed in groups for the respective liquid crystal display sections 13R, 13G, and 13B. The liquid crystal display sections 13R, 13G, and 13B are driven by sequentially applying scanning voltages to the scanning electrodes X1, X2, ... Xn and respectively applying red, green, and blue image signals to the signal electrodes Y1, Y2, ... Yn. In this case, a simple matrix type liquid crystal display panel is exemplified. However, the liquid crystal display 12 may be designed as a TFT active matrix type for selectively driving the respective pixel electrodes by means of a thin-film transistor (TFT).

This liquid crystal display panel 12 is arranged to be almost parallel to the outer side surface of the image pick up apparatus A in such a manner that the longitudinal direction of the panel 12 (the direction in which the liquid crystal display sections 13R, 13G, and 13B are arranged) coincides with the front-rear direction of the image pick up apparatus A. A panel-like backlight 14 having substantially the same area as that of the liquid crystal display panel 12 is arranged under the lower surface of the panel 12 so as to be parallel thereto. Note that the backlight 14 is designed to radiate white light onto the liquid crystal display panel 12, and red, green, and blue color filters (not shown) are respectively arranged on the liquid crystal display sections 13R, 13G, and 13B of the panel 12.

Figure 1:
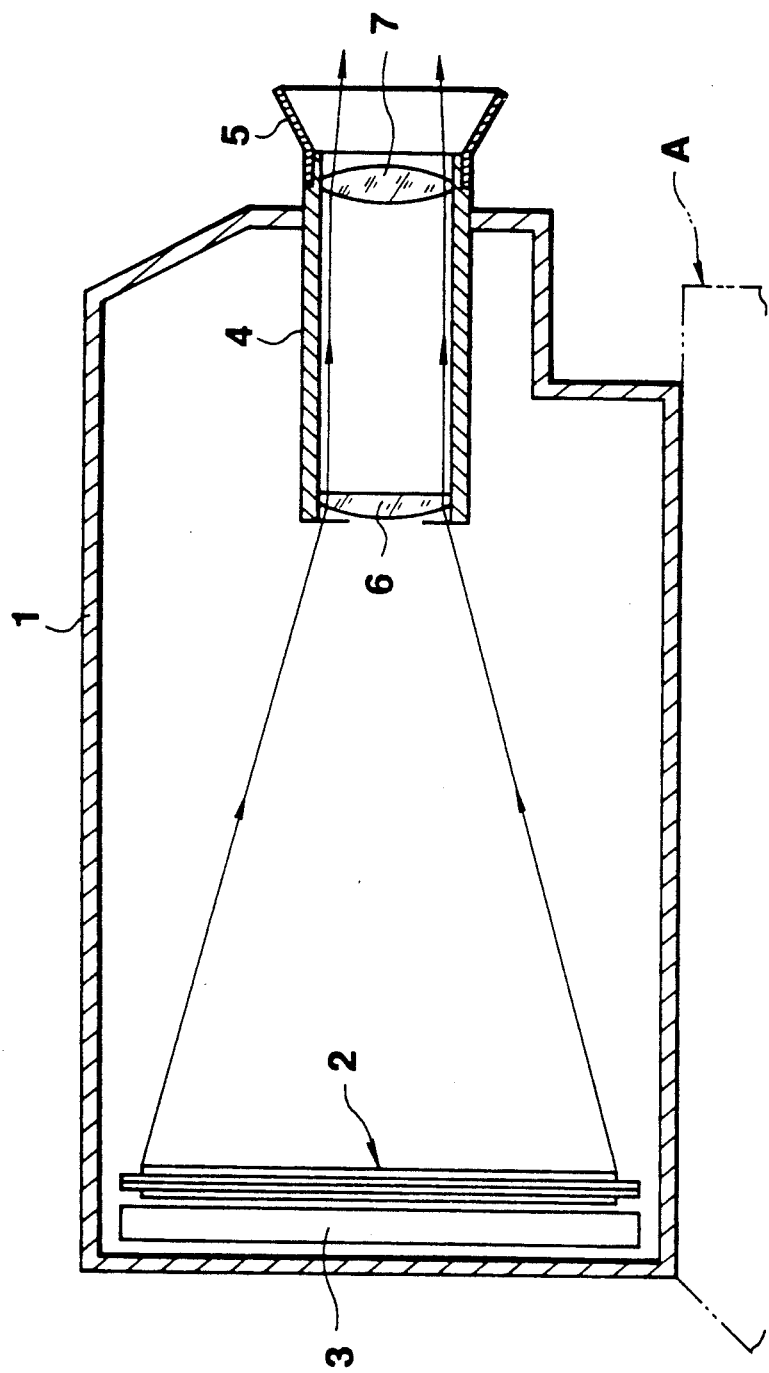
FIG. 1 a view showing a conventional viewfinder mounted on a video camera.
Figure 2:
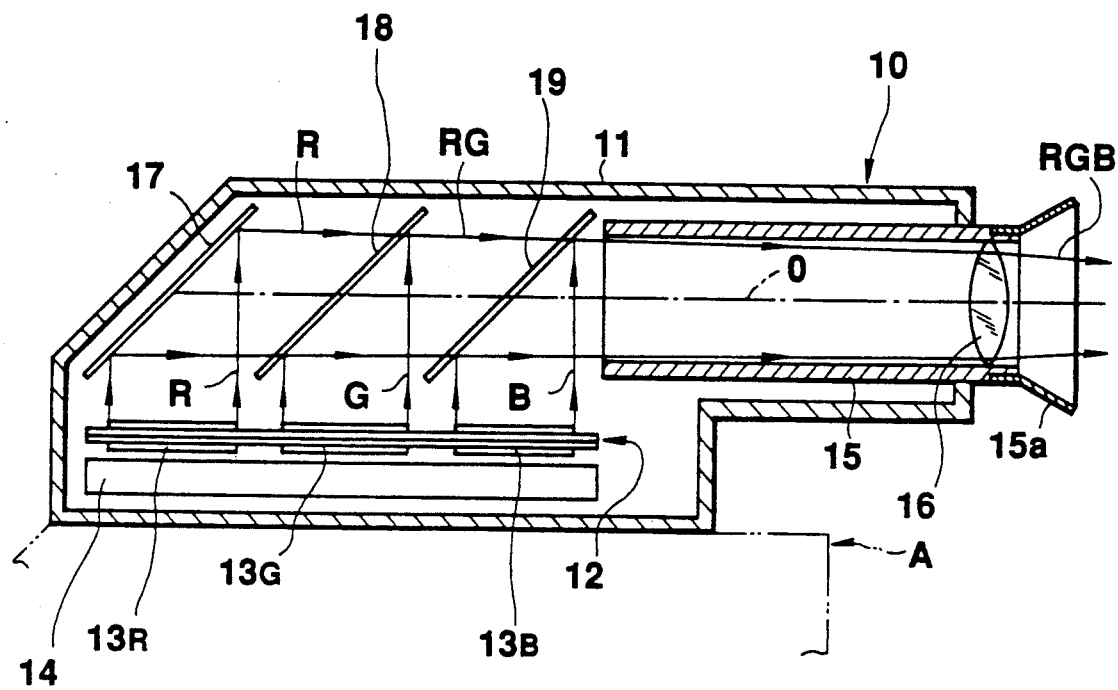
FIG. 2 is a sectional view of a viewfinder according to the first embodiment of the present invention.

Referring to FIG. 2, reference numeral 15 denotes a mirror barrel arranged in the finder case 11. The mirror barrel 15 is arranged outside the liquid crystal display panel 12 so as to extend along the direction in which the liquid crystal display sections 13R, 13G, and 13B of the panel 12 are arranged. The eyepiece-side end portion of the mirror barrel 15 extends outward from the rear end surface of the finder case 11, and an eyecup 15a is formed on the extended end. An eyepiece 16 is arranged on the eyepiece side of the mirror barrel 15 in such a manner that an optical axis O of the eyepiece 16 is almost parallel to the direction in which the liquid crystal display sections 13R, 13G, and 13B are arranged.

A red image light reflecting mirror (a dichroic mirror or a normal mirror) 17 is arranged on the incidence side of the eyepiece 16. The mirror 17 reflects a red image light beam R from the red image display section 13R frontmost (the incident direction of light) viewed from the eyepiece 16, toward the eyepiece 16. First and second image light synthesizing mirrors 18 and 19 (dichroic mirrors) are arranged between the red image light reflecting mirror 17 and the eyepiece 16. The first image light synthesizing mirror 18 reflects a green image light beam G from the green image display section 13G toward the eyepiece 16 and transmits the red image light beam R reflected by the red image light reflecting mirror 17. The second image light synthesizing mirror 19 reflects a blue image light beam B from the blue image display section 13B toward the eyepiece 16 and transmits the red image light beam R and the green image light beam G which is reflected by the first image light synthesizing mirror 18. The centers of these mirrors 17, 18, and 19 are matched with the optical axis O of the eyepiece 16. In addition, they are arranged at an inclination angle of about 45° with respect to the optical axis O. These mirrors 17, 18, and 19 respectively oppose the liquid crystal display sections 13R, 13G, and 13B of the liquid crystal display panel 12.

In the liquid crystal viewfinder 10 of this embodiment, light emitted from the backlight 14 is incident on the liquid crystal display sections 13R, 13G, and 13B of the liquid crystal display panel 12. In addition, the red, green, and blue image light beams R, G, and B from the liquid crystal display sections 13R, 13G, and 13B, are respectively reflected by the red image light reflecting mirror 17 and the first and second image light synthesizing mirrors 18 and 19 toward the eyepiece 16. The red image light beam R reflected by the red image light reflecting mirror 17 is transmitted through the first image light synthesizing mirror 18 and superposed on the green image light beam G reflected by the mirror 18, and the red image light R and the green image light G are synthesized. A composite image light beam RG obtained by synthesizing the red and green image light beams R and G is transmitted through the second image light mixing mirror 19 and is superposed on the blue image light beam B reflected by the second image synthesizing mirror 19, and the composite image light beam RG and the blue image light beam B are synthesized into one full-color image light beam RGB. This full-color image light beam is observed through the eyepiece 16.

As described above, according to the liquid crystal viewfinder of this embodiment, one full-color image is formed by superposing red, green, and blue images displayed by the liquid crystal display sections 13R, 13G, and 13B of the liquid crystal display panel 12 on each other. Therefore, high resolution can be realized in comparison with a conventional liquid crystal viewfinder using a full-color liquid crystal display panel for displaying a full-color image by alternately arranging pixels of three colors, i.e., red, green, and blue. In addition, since the liquid crystal display sections 13R, 13G, and 13B separately display images of a plurality of colors constituting a full-color image, the sections 13R, 13G, and 13B require a smaller number of pixels than the above-mentioned full-color liquid crystal display panel. This can reduce the screen size of the liquid crystal display sections 13R, 13G, and 13B. In the above-described liquid crystal viewfinder, the liquid crystal display sections 13R, 13G, and 13B are arranged on the same plane along the outer side surface of the image pick up apparatus A, and the thickness of the sections 13R, 13G, and 13B (of the liquid crystal display panel 12) is very small. For this reason, these liquid crystal display sections 13R, 13G, and 13B hardly affect the protrusion height of the overall viewfinder from the outer side surface of the image pick up apparatus. In addition, since the liquid crystal display sections 13R, 13G, and 13B have small screens as described above, the eyepiece 16, the image light reflecting mirror 17, and the image light synthesizing mirrors 18 and 19, which are arranged outside the sections 13R, 13G, and 13B so as to extend upright from the outer side surface of the image pick up apparatus, can be reduced in diameter and width. For this reason, the protrusion height of the overall viewfinder from the image pick up apparatus can be decreased. Moreover, in this liquid crystal viewfinder, since the liquid crystal display sections 13R, 13G, and 13B are small in size, the case 11 is only required to have a width (in the direction of the upper and lower surfaces of the drawing) substantially equal to the width of the sections 13R, 13G, and 13B in the direction perpendicular to the direction in which the sections 13R, 13G, and 13B are arranged. Therefore, the width of the overall viewfinder can be greatly reduced as compared with the conventional liquid crystal viewfinder.

In the first embodiment, the optical paths from the liquid crystal display sections 13R, 13G, and 13B of the liquid crystal display panel 12 to the eyepiece 16 differ in length from each other. With this arrangement, the red and green image light beams R and G, which are incident on the eyepiece 16 through the long optical paths, greatly diverge, and their luminances are attenuated. For this reason, the color balance of the composite full-color image is degraded to some extent. However, this color balance can be compensated for by adjusting the luminances of light beams to be respectively radiated from the backlight 14 onto the liquid crystal display sections 13R, 13G, and 13B. In addition, with the arrangement of the second embodiment (to be described later), a full-color image having excellent color balance can be formed without adjusting the luminances of light beams to be radiated onto the liquid crystal display sections 13R, 13G, and 13B.

Figure 5:
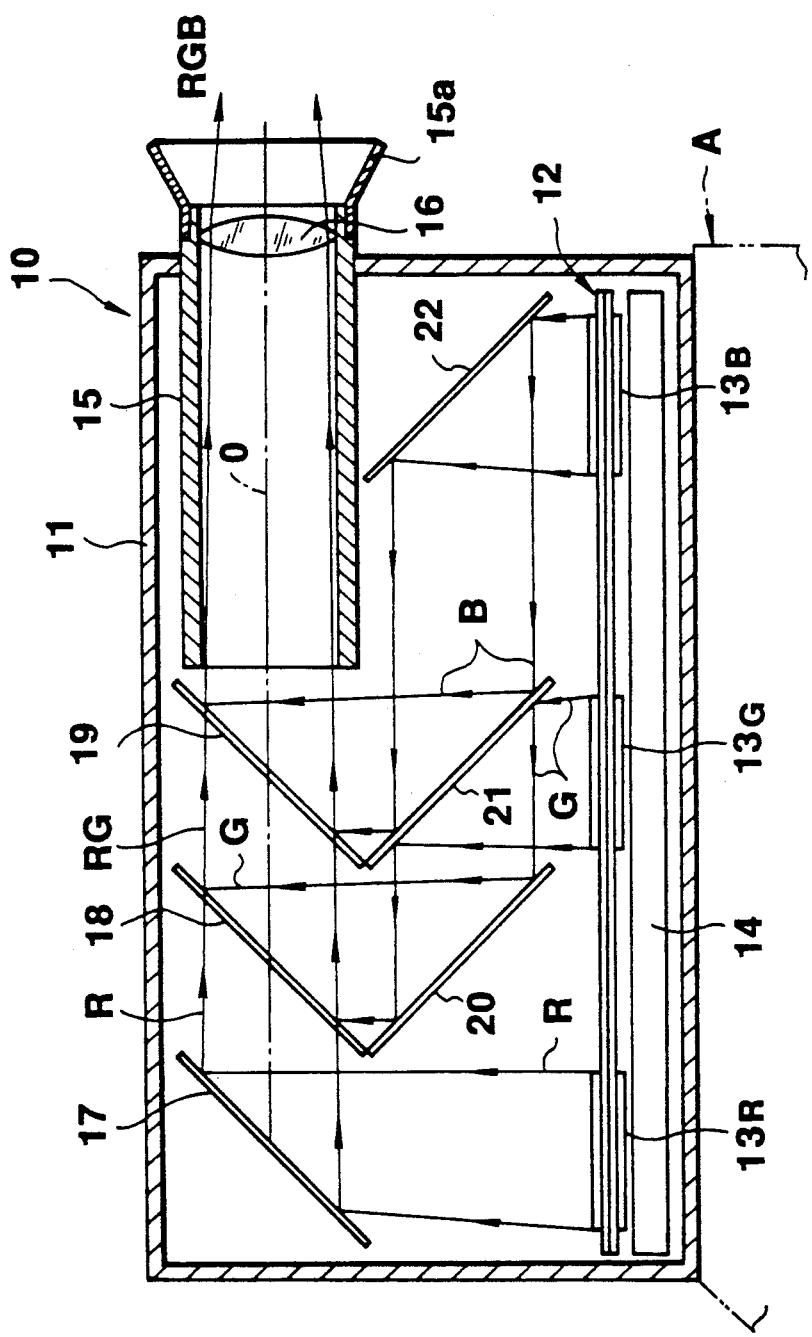
FIG. 5 is a sectional view of a viewfinder according to the second embodiment of the present invention.

FIG. 5 shows the second embodiment of the present invention. In a liquid crystal viewfinder of this embodiment, the optical paths from liquid crystal display sections 13R, 13G, and 13B of a liquid crystal display panel 12 to an eyepiece 16 are set to be substantially equal in length to each other. The same reference numerals in FIG. 5 denote the same parts as in FIG. 2, and a description thereof will be omitted.

As shown in FIG. 5, in the liquid crystal viewfinder of this embodiment, of optical paths for guiding image light beams R, G, and B from the liquid crystal display sections 13R, 13G, and 13B of the liquid crystal display panel 12 to a red image light reflecting mirror 17 and image light synthesizing mirrors 18 and 19, the optical paths for guiding image light beams to the image light synthesizing mirrors 18 and 19 are formed into refracting optical paths with mirrors. The red image light reflecting mirror 17 directly opposes the red image display section 13R. The red image light beam R from this red image display section 13R is reflected by the red image light reflecting mirror 17 and is transmitted through the first and second image light synthesizing mirrors 18 and 19 so as to be incident on the eyepiece 16.

Mirrors 20 and 21 are arranged outside the first and second image light synthesizing mirrors 18 and 19 so as to be located between the mirrors 18 and 19 and the liquid crystal display panel 12. The mirrors 20 and 21 are inclined at an angle of about 90° with respect to the mirrors 18 and 19. Of these mirrors 20 and 21, the mirror 21 opposing the second image light synthesizing mirror 19 is constituted by a double-side reflecting mirror. The other reflecting surface (the lower reflecting surface in FIG. 5 not opposing the mirror 19) of the double-side reflecting mirror 21 opposes the middle green image display section 13G of the liquid crystal display panel 12 at an inclination angle of about 45°. The green image light beam G from the green image display section 13G is guided to the first image light synthesizing mirror 18 through the refracting optical path defined by the other reflecting surface of the double-side reflecting mirror 21 and the mirror 20. The light beam G is then reflected by the first image light synthesizing mirror 18 and is transmitted through the second image light synthesizing mirror 19 so as to be incident on the eyepiece 16. Reference numeral 22 denotes a mirror which is arranged to oppose the one reflecting surface (the upper reflecting surface in FIG. 5) of the double-side reflecting mirror 21 and to be parallel to the mirror 21. The mirror 22 opposes the blue image display section 13B of the liquid crystal display panel 21 at an inclination angle of about 45°. The blue image light beam B from the blue image display section 13B is guided to the second image light synthesizing mirror 19 through the refracting optical path defined by the mirror 22 and the one reflecting surface (the upper reflecting surface in FIG. 5) of the double-side reflecting mirror 21. The light beam B is then reflected by the second image light synthesizing mirror 19 and is incident on the eyepiece 16.

The red image light reflecting mirror 17 and the image light synthesizing mirrors 18 and 19 located on the incidence side of the eyepiece 16, and the mirrors 20, 21, and 22 constituting the refracting optical paths of the green and blue image light beams G and B are positioned in such a manner that the optical path of the image light beams R, G, and B from the liquid crystal display sections 13R, 13G, and 13B of the liquid crystal display panel 12 to the eyepiece 16 are almost equal in length to each other. In accordance with the above-mentioned mirror arrangement, the liquid crystal display sections 13R, 13G, and 13B of the liquid crystal display panel 12 are positioned to respectively oppose the red image light reflecting mirror 17, the double-side reflecting mirror 21, and the mirror 22.

Similar to the first embodiment, in the liquid crystal viewfinder of the second embodiment, the red, green, and blue image light beams R, G, and B from the liquid crystal display sections 13R, 13G, and 13B of the liquid crystal display panel 12 are synthesized by the red image light reflecting mirror 17 and the first and second image light synthesizing mirrors 18 and 19 arranged on the incidence side of the eyepiece 16 so as to obtain one full-color image light beam RGB. Therefore, high resolution can be realized as compared with the conventional liquid crystal viewfinder. In addition, the protrusion height of the overall viewfinder from the image pick up apparatus can be decreased. In this embodiment, since the installation space for the mirrors 20, 21, and 22 constituting the refracting optical paths of the green and blue image light beams G and B must be ensured between the red image light reflecting mirror 17 and the image light synthesizing mirrors 18 and 19, and the liquid crystal display panel 12, the protrusion height of the overall viewfinder from the image pick up apparatus is relatively larger than that of the viewfinder of the first embodiment. However, since the mirrors 20, 21, and 22 constituting the refracting optical paths are inclined at about 45°, and the liquid crystal display sections 13R, 13G, and 13G have small screens, the mirrors 20, 21, and 22 need not have large widths. Therefore, the protrusion height of the overall viewfinder from the image pick up apparatus can be decreased as compared with the conventional viewfinder. In addition, similar to the first embodiment, the width of the overall viewfinder can be greatly decreased.

In the liquid crystal viewfinder of the second embodiment, of the optical paths for guiding the image light beams R, G, and B from the liquid crystal display sections 13R, 13G, and 13B to the red image light reflecting mirror 17 and the image light synthesizing mirrors 18 and 19, the optical paths for guiding the image light beams G and B to the image synthesizing mirrors 18 and 19 which are separated from the eyepiece 16 at relatively short distances are formed into the refracting optical paths including the mirrors 20, 21, and 22. In addition, the respective mirrors 17, 18, 19, 20, 21, and 22 are positioned such that the optical paths from the liquid crystal display sections 13R, 13G, and 13B to the eyepiece 16 are set to be almost equal in length to each other. With this arrangement, the image light beams R, G, and B from the liquid crystal display sections 13R, 13G, and 13B are incident on the eyepiece 16 through the optical paths having almost the same length. If the image light beams R, G, and B from the liquid crystal display sections 13R, 13G, and 13B are incident on the eyepiece 16 through the optical paths having almost the same length in this manner, since the image light beams R, G, and B are incident on the eyepiece 16 as light beams having substantially same luminance, a full-color image having good color balance, i.e., consisting of red, green, and blue image light beams having substantially the same luminance, can be observed through the eyepiece 16.

In this embodiment, of the mirrors 21, 20, and 22 constituting the refracting optical paths for guiding the image light beams G and B to the image light synthesizing mirrors 18 and 19, the mirror 21 is constituted by the double-side reflecting mirror and is commonly used for the two refracting optical paths. However, this mirror 21 may be constituted by two mirrors. In addition, in this embodiment, of the optical paths for guiding the image light beams R, G, and B from the liquid crystal display sections 13R, 13G, and 13B to the red image light reflecting mirror 17 and the image light synthesizing mirrors 18 and 19, only the optical paths for guiding the image light beams G and B to the image light synthesizing mirrors 18 and 19 which are separated from the eyepiece 16 at relatively short distances are formed into the refracting optical paths. However, the optical path for guiding the red image light beam R to the red image light reflecting mirror 17 which is separated from the eyepiece 16 at the greatest distance may be formed into a refracting optical path including a mirror. Similar to the above embodiment, in this case, if the mirrors 17, 18, 19, 20, 21 and 22 and the mirror constituting the refracting optical path of the red image light beam R are positioned to allow the optical paths from the liquid crystal display sections 13R, 13G, and 13B to the eyepiece 16 to have substantially the same length, a full-color image having good color balance can be formed by the image light beams R, G, and B having substantially the same luminance.

In the first and second embodiments, the backlight 14 is designed to radiate white light. However, this backlight 14 may be designed to radiate red, green, and blue light beams onto the liquid crystal display sections 13R, 13G, and 13B of the liquid crystal display panel 12, respectively. In this case, no color filters need be arranged on the liquid crystal display sections 13R, 13G, and 13B.

In addition, in the first and second embodiments, the liquid crystal display sections 13R, 13G, and 13B for displaying red, green, and blue images are formed on the single liquid crystal display panel 12. However, the liquid crystal display sections 13R, 13G, and 13B may be arranged on separate liquid crystal display panels.

Moreover, in the first and second embodiments, the exemplified liquid crystal viewfinder is designed to synthesize the three color image light beams, i.e., the red, green, and blue image light beams R, G, and B from the three liquid crystal display sections 13R, 13G, and 13B so as to obtain one full-color image light beam RGB. However, the present invention is not limited to this. For example, each of the liquid crystal display sections 13R, 13G, and 13B in the respective embodiments may be divided into two display sections for respectively displaying one and the other halves of an image, so that red, green, and blue image light beams from the pairs of display sections, i.e., a total of six display sections are synthesized into one full-color image. Alternatively, a liquid crystal display section for displaying one or two of red, green, and blue images, and a liquid crystal display section for displaying the other two or one color images may be arranged on the same plane, and the respective image light beams from the two liquid crystal display sections may be synthesized into one full-color image light beam.

A liquid crystal projector according to the third embodiment of the present invention will be described below with reference to FIGS. 6 and 7.

Figure 6:
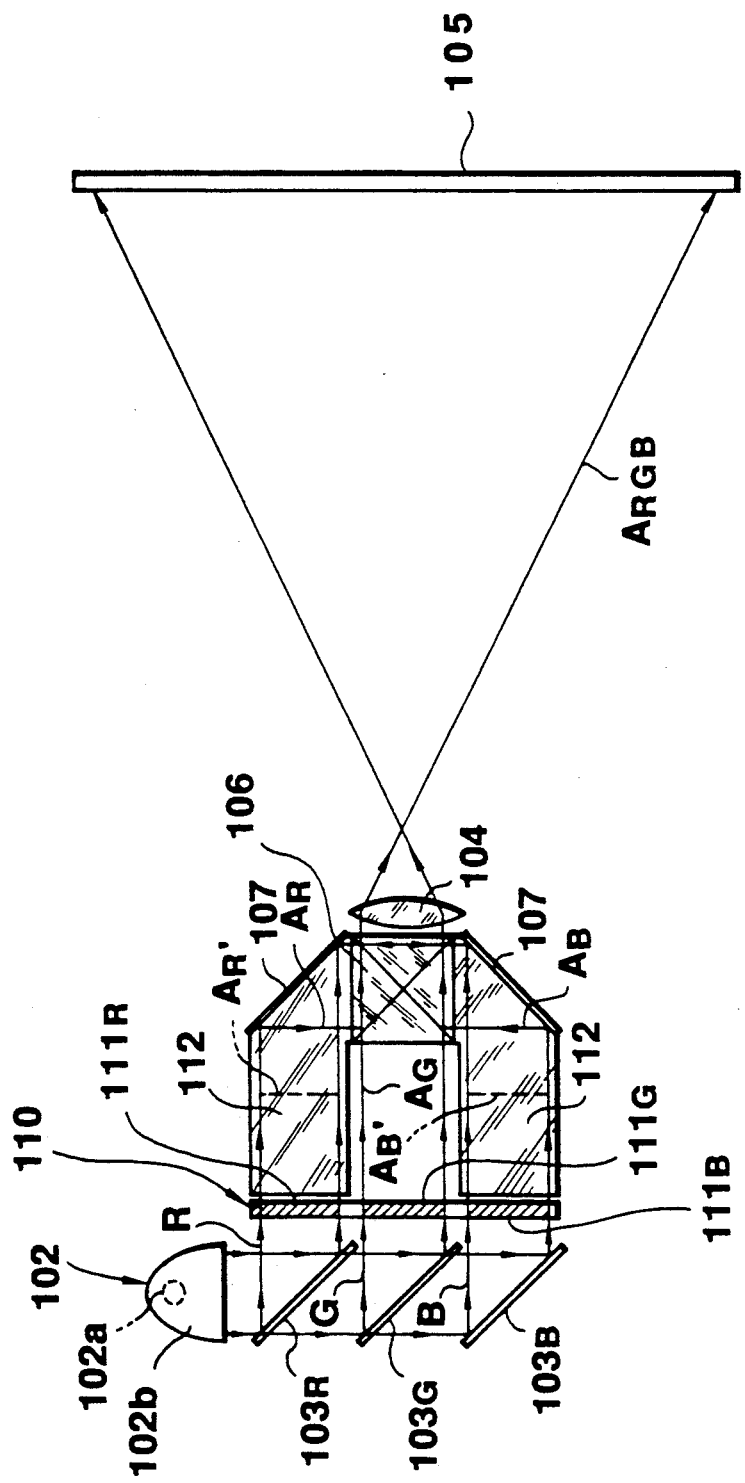
FIG. 6 is a sectional view of a liquid crystal display apparatus according to the third embodiment of the present invention.

FIG. 6 shows an arrangement of the overall liquid crystal projector.

Referring to FIG. 6, reference numerals 111R, 111G, and 111B respectively denote liquid crystal display sections. These liquid crystal display sections 111R, 111G, and 111B are constituted by liquid crystal display panels having the same structure. The liquid crystal display sections 111R, 111G, and 111B are arranged in a line on the same plane. These display sections 111R, 111G, and 111B are synchronously driven. The first to third liquid crystal display sections 111R, 111G, and 111B are respectively used as red, green, and blue image display sections. Reference numeral 102 denoes a light source. The light source 102 comprises a light source lamp 102a and a reflector 102b for reflecting light radiated from the light source lamp 102a as a collimated light beam. Red, green, and blue light separating dichroic mirrors 103R, 103G, and 103B are arranged in front of the light source 102 in the order named and are inclined at 45°. The red light separating dichroic mirror 103R reflects light having a wavelength of a red component and transmits light having other wavelengths. The green light separating dichroic mirror 103G reflects light having a wavelength of a green component and transmits light having other wavelengths. The blue light separating dichroic mirror 103B reflects light having a wavelength of a blue component and transmits light having other wavelengths. These dichroic mirrors 103R, 103G, and 103B respectively oppose the incidence surfaces of the liquid crystal display sections 111R, 111G, and 111B. A red light beam R of white light from the light source 102 is reflected by the red light separating dichroic mirror 103R and is incident on the red image display section 111R. Of the light beams (green and blue light beams) transmitted through the dichroic mirror 103R, a green light beam G is reflected by the green light separating dichroic mirror 103G and is incident on the green image display section 111G. A blue light beam B transmitted through the dichroic mirror 103G is reflected by the blue light separating dichroic mirror 103B and is incident on the blue image display section 111B. Red, green, and blue image light beams $A_R$, $A_G$, and $A_B$ from the liquid crystal display sections 111R, 111G, and 111B are incident on an image light synthesizing element 106 to obtain one full-color image light $A_{RGB}$. The image light synthesizing element 106 is constituted by a dichroic prism obtained by bonding four prisms and coating the bonding surfaces with dichroic layers. The full-color image light beam $A_{RGB}$ is then projected on a screen 105 by means of a projection lens 104. The liquid crystal display sections 111R, 111G, and 111B are formed on a single liquid crystal display panel 110.

The liquid crystal display panel 110 has the same arrangement as that of the liquid crystal display panel 12 in the first embodiment shown in FIG. 3.

As shown in FIG. 6, the liquid crystal display panel 110 is designed as follows. The middle green image display section 111G of the panel 110 is arranged to oppose one of the three incidence-side boundary surfaces of the image light synthesizing element 106, which opposes its emergence-side boundary surface. The red and blue image display sections 111R and 111B located on both the end portions of the panel 110 are arranged to oppose the other two incidence-side boundary surfaces of the image light synthesizing element 106 and to oppose anti-transmission mirrors 107 which are arranged to oppose the other two incidence-side boundary surfaces and to be inclined at about 45°.

Referring to FIG. 6, reference numeral 112 denotes a transparent member. The transparent members 112 are respectively arranged in longer optical paths of the optical paths between the liquid crystal display sections 111R, 111G, and 111B of the liquid crystal display panel 110 and the image light synthesizing element 106, which include the anti-transmission mirrors 107. That is, the transparent members 112 are respectively arranged in the optical path of the red image light beam $A_R$ from the red image display section 111R and the optical path of the blue image light beam $A_B$ from the blue image display section 111B in order to restrict the divergence of the red and blue image light beams $A_R$ and $A_B$. These transparent members 112 are made of a material having a high transmittance, such as glass. The incidence-side boundary surfaces of the transparent members 112, which oppose the red and blue image display sections 111R and 111B, are formed into flat surfaces parallel to the surface of the liquid crystal display panel 110. The emergence-side boundary surfaces of the transparent members 112, which oppose the image light synthesizing element 106, are formed into flat surfaces parallel to the incidence-side boundary surface of the element 106. In addition, the surfaces of the transparent members 112 which oppose the anti-transmission mirrors 107 are formed into inclined surfaces which are inclined at about 45° with respect to the incidence- and emergence-side boundary surfaces of the transparent members 112. The anti-transmission mirrors 107 are arranged to be in contact with these inclined surfaces, respectively. In this embodiment, the anti-transmission mirrors 107 are respectively arranged on the inclined surfaces of the transparent members 112. However, the anti-transmission mirrors 107 may be formed by coating the inclined surfaces of the transparent members 112 with anti-transmission layers.

As described above, in the liquid crystal projector of this embodiment, the transparent members 112 for restricting the divergence of the red and blue image light beams $A_R$ and $A_B$ are arranged in the longer optical paths of the red and blue image light beams $A_R$ and $A_B$ of the optical paths between the liquid crystal display sections 111R, 111G, and 111B and the image light synthesizing element 106. This arrangement allows substantially uniform divergence of the red, green, and blue image light beams $A_R$, $A_G$, and $A_B$, which are radiated from the liquid crystal display sections 111R, 111G, and 111B onto the image light synthesizing element 106.

Figure 7:
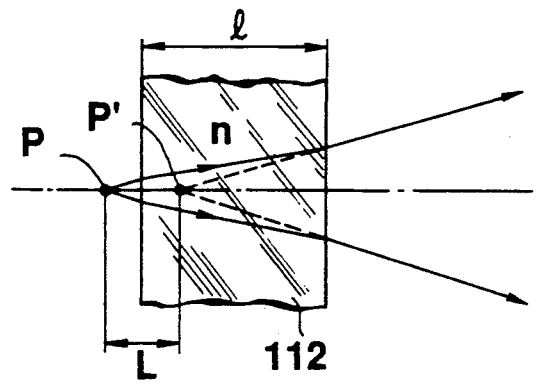
FIG. 7 is a view showing the divergence of a light beam transmitted through a transparent member in the second and third embodiments.

FIG. 7 shows a light beam divergence restricting effect obtained by each transparent member 112. A light beam incident from a point P on an optical axis O is refracted, as shown in FIG. 7. The light beam is then refracted and output from the transparent member 112, as shown in FIG. 7. Therefore the light beam emerging from the transparent member 112 can be regarded as a light beam from a focal point P′ of the virtual image formed by the light. That is, if an object at the point P is seen through the transparent member 112, the object is seen at a position shifted to the observer by a distance L between the points P and P'. If the refractive index of the transparent member 112 is represented by n, and the length of the transparent member 112 in the light transmission direction is represented by l, the distance L is given by:

$$L = (1 - 1/n)l$$

If the refractive index n of each transparent member 112 and the length l thereof in the light transmission direction (the length from the incidence-side boundary surface to each anti-transmission mirror 107 surface + the length from each anti-transmission mirror 107 surface to the emergence-side boundary surface) are selected such that virtual images $A_R'$ and $A_B'$ (see FIG. 6) of the red and blue image light beams $A_R$ and $A_B$ which are incident on the image light synthesizing element 106 through the transparent members 112 are respectively formed at positions shifted from the red and blue image display sections 111R and 111B toward the observer by a distance corresponding to the difference in length between the optical path from the green image display section 111G to the image light synthesizing element 106 and the optical paths from the red and blue image display sections 111R and 111B to the image light synthesizing element 106, the length of the optical paths of the red and blue image light beams $A_R$ and $A_B$ regarded as light beams from the positions of the virtual images $A_R'$ and $A_B'$ can be set to be substantially equal to that of the apparent optical path of the green image light beam $A_G$ from the green image display section 111G.

According to the above-described liquid crystal projector, therefore, the image light beams $A_R$, $A_G$, and $A_B$ from the liquid crystal display sections 111R, 111G, and 111B can be radiated on the image light synthesizing element 106 with substantially uniform divergence, i.e., substantially the same luminance. Therefore, a full-color image light $A_{RGB}$ obtained by the image synthesizing element 106 can be projected on the screen 105 as an image having good color balance.

In this embodiment, a liquid crystal projector is exemplified. However, the present invention is not limited to this. For example, the present invention can be applied to a viewfinder of a video camera.

Figure 8:
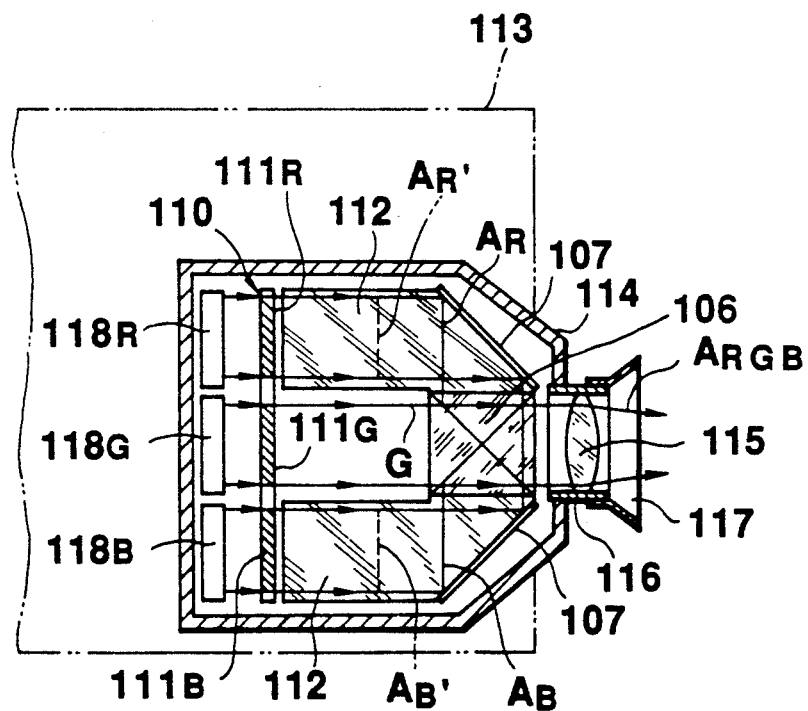
FIG. 8 is a sectional view of a viewfinder according to the fourth embodiment of the present invention.

FIG. 8 shows the fourth embodiment of the present invention. In this embodiment, the present invention is applied to a viewfinder.

Referring to FIG. 8, reference numeral 113 denotes a video camera; and 114, a case of the viewfinder. A mirror barrel 116 including a eyepiece 115 is arranged on an end face of the case 114. Reference numeral 117 denotes an eyecup formed on an end portion of the mirror barrel 116. In the case 114, a liquid crystal display panel 110 on which red, green, and blue image display sections 111R, 111G, and 111B are formed, an image light synthesizing element 106 constituted by a dichroic prism, anti-transmission mirrors 107, and transparent members 112 for restricting the divergence of red and blue image light beams $A_R$ and $A_B$ are arranged in a manner similar to the first embodiment. In addition, light sources 118R, 118G, and 118B (panel-like light sources using fluorescent lamps) for radiating red, green, and blue light beams are respectively arranged to oppose the display sections 111R, 111G, and 111B of the liquid crystal display panel 110.

In this viewfinder, red, green, and blue light beams from the light sources 118R, 118G, and 118B are incident on the liquid crystal display sections 111R, 111G, and 111B of the liquid crystal display panel 110. Image light beams of three colors, i.e., red, green, and blue image light beams $A_R$, and $A_B$ from the display sections 111R, 111G, and 111B are then caused to be incident on the image light synthesizing element 106 so as to be synthesized into one full-color image light beam $A_{RGB}$. This full-color image light beam $A_{RGB}$ is seen through the eyepiece 15.

Similar to the above-described embodiment, in this viewfinder, the transparent members 112 for restricting the divergence of the red and blue image light beams $A_R$ and $A_B$ are respectively arranged in the longer optical paths of the red and blue image light beams $A_R$ and $A_B$ of the optical paths extending from the display sections 111R, 111G, and 111B to the image light synthesizing element 106. This arrangement allows substantially uniform divergence of the red, green, and blue image light beams $A_R$, $A_G$, and $A_B$ which are incident from the display sections 111R, 111G, and 111B of the liquid crystal display panel 110 onto the image light synthesizing element 106. Since the respective color image light beams $A_R$, $A_G$, and $A_B$ from the display sections 111R, 111G, and 111B can be caused to be incident on the image light synthesizing element 106 with substantially the same apparent optical path length, i.e., substantially the same luminance, a full-color image light beam $A_{RGB}$ can be obtained by the image light synthesizing element 106 as an image having good color balance.

In this embodiment, the light sources 118R, 118G, and 118B of three colors, i.e., red, green, and blue are used as light sources. If, however, red, green, and blue color filters are respectively formed on the display sections 111R, 111G, and 111B of the liquid crystal display panel 110, a white light source can be used. In this case, only one light source may be arranged to oppose all the display sections 111R, 111G, and 111B. This equally applies to the first embodiment.

In the third and fourth embodiments, the transparent members 112 for restricting the divergence of the image light beams $A_R$ and $A_B$ are arranged in only the longer optical paths of the red and blue image light beams $A_R$ and $A_B$ of the optical paths extending from the display sections 111R, 111G, and 111B to the image light synthesizing element 106. However, these transparent members may be arranged in the optical paths of all the colors, i.e., red, green, and blue. In this case, the transmittances of the transparent members in the longer optical paths and the shorter optical path, and/or their lengths along the light transmission direction are selected in accordance with the difference between the lengths of the optical paths so as to set substantially the same apparent optical path length.

In the above-described embodiment, the display sections 111R, 111G, and 111B for respectively displaying red, green, and blue images are formed on the single liquid crystal display panel 110. However, the display sections 111R, 111G, and 111B may be formed as separate liquid crystal display panels. In addition, these display sections 111R, 111G, and 111B are not limited to a liquid crystal display panel, and may be formed as a CRT or the like. Furthermore, the image light synthesizing element 106 is not limited to the dichroic prism obtained by bonding four prisms together, but may be constituted by an X type dichroic prism obtained by combining dichroic mirrors in the form of the letter "X".

In the above-described embodiment, a display apparatus for synthesizing the red, green, and blue image light beams $A_R$, $A_G$, and $A_B$ from the three display sections 111R, 111G, and 111B into one full-color image light beam $A_{RGB}$ is exemplified. It is apparent that the present invention can be applied to various display apparatuses, e.g., a display apparatus wherein each of the display sections 111R, 111G, and 111B in the above embodiment is divided into two display sections for respectively displaying one and the other halves of an image, and red, green, and blue image light beams from these pairs of display sections, i.e., a total of six display sections are synthesized into on full-color image light beam, and a display apparatus wherein a display section for displaying an image or images of one or two of red, green, and blue, and a display section for displaying an image or image of the other two or one colors are respectively arranged at the positions of the green image display section 111G and of the red or blue image display section 111R or 111B, and the respective color image light beams from these two display sections are synthesized into one full-color image light beam.

The fifth embodiment of the present invention will be described below with reference to FIGS. 9 to 12.

Figure 9:
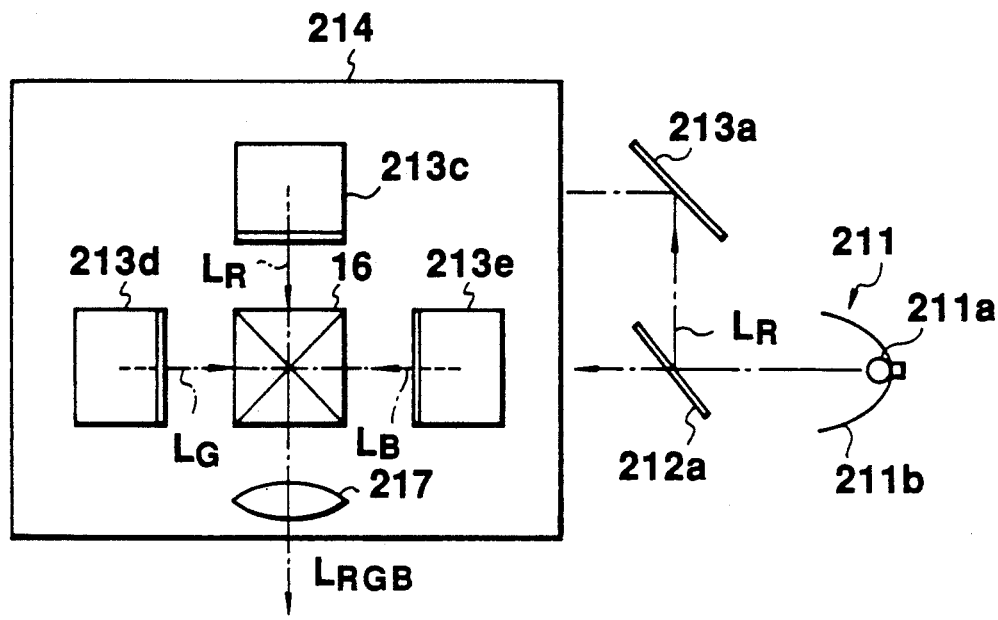
FIG. 9 is a top view of a liquid crystal display apparatus according to the fifth embodiment of the present invention.
Figure 10:
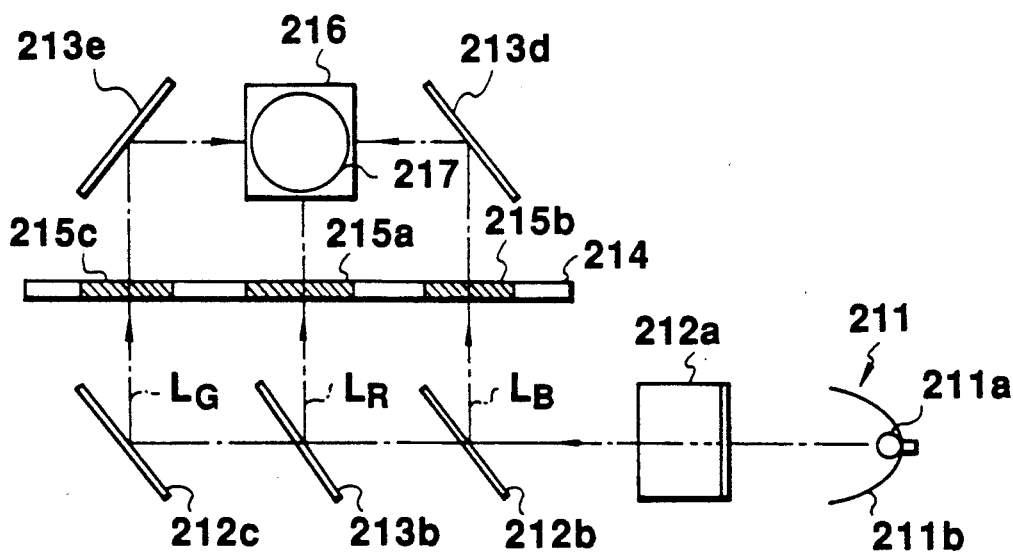
FIG. 10 is a front view of the liquid crystal display apparatus of the fifth embodiment.
Figure 11:
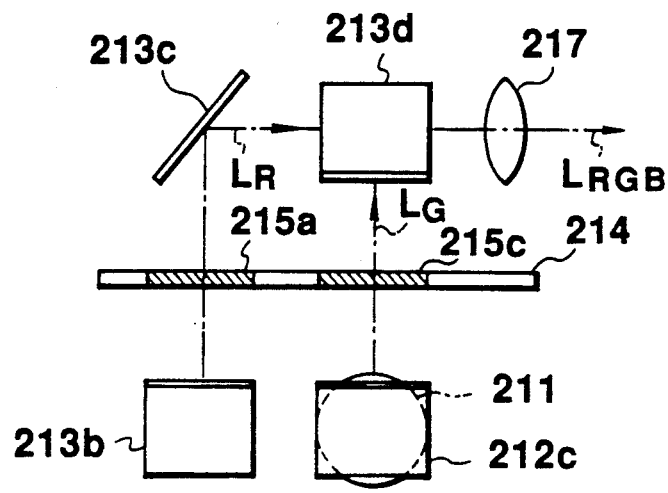
FIG. 11 is a side view of the liquid crystal display apparatus of the fifth embodiment.

FIG. 9 is a plan view showing a liquid crystal projector according to the fifth embodiment of the present invention. FIGS. 10 and 11 are front and side views of the projector. Referring to FIGS. 9 to 11, a light source 211 is constituted by a light source lamp 211a such as a halogen lamp, and a reflector 211b for reflecting light radiated from the light source lamp 211a forward as a collimated light beam. Dichroic mirrors 212a, 212b, and 212c are arranged in a line in front of the light source 211 at an inclination angle of about 45°. These dichroic mirrors 212a, 212b, and 213c serve to separate light (white light) from the light source 211 into light beams $L_R$, $L_B$, and $L_G$ respectively having wavelengths of red, blue, and green. The light beam $L_R$ having the wavelength of a red component separated by the dichroic mirror 212a is incident on a liquid crystal display panel 214 through mirrors 213a and 213b. The light beams $L_B$ and $L_G$ having the wavelengths of blue and green components separated by the dichroic mirrors 212b and 212c are directly incident on the liquid crystal display panel 214.

Figure 12:
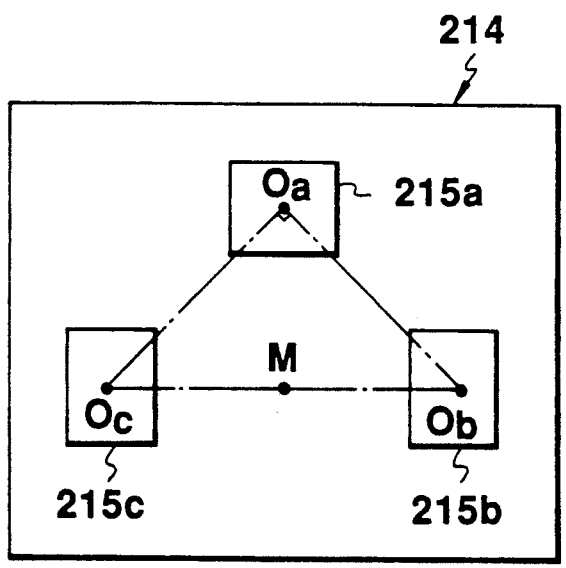
FIG. 12 is a view showing an arrangement of liquid crystal display panels in the fifth embodiment.

As shown in FIG. 12, the liquid crystal display panel 214 has three display sections 215a, 215b, and 215c having the same size and arranged on the same plane. Red, blue, and green components of a single image can be displayed on these display sections 215a, 215b, and 215c. The display sections 215a, 215b, and 215c are arranged in such a manner that a line connecting centers Oa, Ob, and Oc of the display sections defines a rectangular equilateral triangle. The light beam $L_R$ reflected by the dichroic mirror 212a is incident on the display section 215a through the mirrors 213a and 213b. The light beams $L_B$ and $L_G$ reflected by the dichroic mirrors 212b and 212c are respectively incident on the display sections 215b and 215c.

A dichroic prism 216 is arranged on the liquid crystal display panel 214. This dichroic prism 216 is arranged on a middle point M of the longest side of the three sides of the rectangular equilateral triangle, i.e., the line segment connecting the centers Ob and Oc of the display sections 215b and 215c. The dichroic prism 216 synthesizes the transmitted light beams $L_R$, $L_B$, and $L_G$ which are incident thereon from the display sections 215a, 215b, and 215c through mirrors 213c, 213d, and 213e, respectively. A lens 217 for projecting a synthesized light beam $L_{RGB}$ from the dichroic prism 216 on a screen (not shown) is arranged in front of the dichroic prism 216.

In the liquid crystal projector having the above-described arrangement, since the display sections 215a, 215b, and 215c are arranged such that a line connecting the centers Oa, Ob, and Oc defines a rectangular equilateral triangle, and the dichroic prism 216 is arranged on the middle point M of the longest side of the three sides of the triangle, the optical paths from the display sections 215a, 215b, and 215c to the dichroic prism 216 have the same length. Therefore, a poor color balance and the like, which tend to appear in an image projected on a screen due to different optical path lengths, can be prevented. This prevents degradation of image quality.

In the fifth embodiment, the three display sections 215a, 215b, and 215c corresponding to red, blue, and green are formed on the single liquid crystal display panel 214. However, the present invention can be applied to any liquid crystal display apparatus as long as it has three display sections 215a, 215b, and 125c corresponding to red, blue, and green arranged on the same plane. In addition, the present invention is not limited to the above-described embodiments. Various changes and modifications can be made within the spirit and scope of the invention.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A liquid crystal viewfinder, comprising:
    a case having an opening portion;
    a fluorescent lamp arranged along a bottom surface of said case and in parallel therewith, said fluorescent lamp having a given length;
    a liquid crystal display panel substrate arranged substantially in parallel with said fluorescent lamp, said fluorescent lamp radiating light onto said liquid crystal panel substrate, said liquid crystal panel substrate including first, second and third liquid crystal display panels formed thereon;
    a first optical member for reflecting a light beam made incident thereon via the first liquid crystal display panel;
    a second optical member for reflecting a light beam made incident thereon via the second liquid crystal display panel and for transmitting the light beam reflected by the first optical member;
    a third optical member for reflecting a light beam made incident thereon via the third liquid crystal display panel and for transmitting the light beam reflected by the second optical member; and
    an eyepiece provided at the opening portion of said case, on which a light beam output from the third optical member is made incident;
    said eyepiece being positioned at said opening to be substantially parallel to both said bottom surface of said case and to said fluorescent lamp; and said liquid crystal display panel substrate having a length which is at least equal to the given length of said fluorescent lamp.

2. A liquid crystal viewfinder according to claim 1, wherein said first, second and third liquid crystal display panels respectively display first, second and third colors.

3. A liquid crystal viewfinder, comprising:
a case having an opening portion;
a liquid crystal display panel substrate arranged in said case, and including first, second and third liquid crystal display panels;
light source means for irradiating light beams on said first, second and third liquid crystal display panels;
first optical means for reflecting a light beam made incident thereon via the first liquid crystal display panel;
second optical means for reflecting a light beam made incident thereon via the second liquid crystal display panel and for transmitting the light beam reflected by the first optical means, said second optical means including three reflection means for reflecting incident light beams substantially at a right angle;
third optical means for reflecting a light beam made incident thereon via the third liquid crystal display panel and for transmitting a light beam made incident thereon via the second optical means, said third optical means including three reflection means for reflecting incident light beams substantially at right angle;
an eyepiece provided at said opening portion of said case, on which a light beam output from the third optical means is made incident; and
said first second and third optical means being located such that the respective distances which light beams travel from the first, second and third liquid crystal panels to said eyepiece are substantially the same.

4. A viewfinder according to claim 3, wherein said light source means comprises a fluorescent lamp.

5. A viewfinder according to claim 3, wherein said light source means comprises a single light source.

6. A viewfinder according to claim 3, wherein said eyepiece outputs a light beam substantially at a right angle with respect to said liquid crystal display panels.

7. A viewfinder according to claim 3, wherein said first, second and third liquid crystal display panels are arranged in a line of given length, and said light source means has a length which is substantially the same as or greater than that of the line of said liquid crystal display panels.

8. A viewfinder according to claim 7, said first, second and third liquid crystal display panels have a common scanning electrode.

9. A liquid crystal viewfinder comprising:
a case having an opening portion;
an eyepiece provided at said opening portion of said case;
light source means arranged along a wall surface of said case opposing said eyepiece and substantially in parallel with the wall surface;
a liquid crystal display panel substrate arranged substantially in parallel with said light source means, said panel substrate including first, second and third liquid crystal display panels, and said second liquid crystal display panel opposing said eyepiece;
optical means for transmitting a light beam output from said second liquid crystal display panel so that said light beam is made incident on said eyepiece, and for making light beams output from said first and third liquid crystal display panels incident on said eyepiece after reflecting the light beams at least once; and
said optical means including optical members for substantially equalizing the respective distances which light beams travel from the first, second and third liquid crystal display panels to the eyepiece.

10. A viewfinder according to claim 9, wherein said optical member comprises a transparent body which suppresses light beam diffusion.

11. A viewfinder according to claim 9, wherein said light source means comprises a fluorescent lamp.

12. A view finder according to claim 9, wherein said first, second and third liquid crystal display panels are arranged in a line of given length, and said light source means has a length which is substantially the same as or greater than that of the line of said liquid crystal display panels.

* * * * *

UNITED STATES PATENT AND TRADEMARK OFFICE
CERTIFICATE OF CORRECTION

PATENT NO. : 5,185,712
DATED       : February 9, 1993
INVENTOR(S) : SATO et al It is certified that error appears in the above-identified patent and that said Letters Patent is hereby corrected as shown below:

Title page, in Section [56] References Cited, under "U.S. Patent documents", insert the following:

```
2,604,813   7/1952    Gretener............88/24
4,425,028   1/1984    Gagnon et al........350/337
4,461,542   7/1984    Gagnon et al........350/331R
4,613,207   9/1986    Fergason............350/331R
4,715,684  12/1987    Gagnon et al........350/331R
4,796,978   1/1989    Tanaka et al........
4,935,758   6/1990    Miyatake et al......353/31
4,943,154   7/1990    Miyatake et al......353/31
4,989,076   1/1991    Owada et al.........358/61
```

Under "Foreign Patent Dcouments", insert the following:

```
63-182987    7/1988   Japan
63-240525   10/1988   Japan
```

Change the issue date of USP 1,319,292 from "10/1951" to --10/1919--.

Signed and Sealed this

Fourth Day of January, 1994

Attest:

BRUCE LEHMAN

Attesting Officer

Commissioner of Patents and Trademarks